(12) United States Patent
Switzer et al.

(10) Patent No.: US 9,796,245 B2
(45) Date of Patent: Oct. 24, 2017

(54) GRILLE FOR VEHICLE WALL OPENING

(71) Applicant: The Boeing Company, Chicago, IL (US)

(72) Inventors: Lon E. Switzer, Marysville, WA (US); Fred P. Siebert, Seattle, WA (US)

(73) Assignee: The Boeing Company, Chicago, IL (US)

( * ) Notice: Subject to any disclaimer, the term of this patent is extended or adjusted under 35 U.S.C. 154(b) by 866 days.

(21) Appl. No.: 14/034,627

(22) Filed: Sep. 24, 2013

(65) Prior Publication Data

US 2015/0087217 A1    Mar. 26, 2015

(51) Int. Cl.
| | | |
|---|---|---|
| *B64D 13/00* | (2006.01) | |
| *B60H 1/26* | (2006.01) | |
| *B60H 1/24* | (2006.01) | |
| *B64C 1/06* | (2006.01) | |
| *B64C 1/00* | (2006.01) | |

(52) U.S. Cl.
CPC .............. *B60H 1/26* (2013.01); *B60H 1/248* (2013.01); *B64C 1/066* (2013.01); *B64C 2001/009* (2013.01)

(58) Field of Classification Search
CPC ........ B60H 1/248; B60H 1/26; B60H 1/3421; B64C 1/066; B64C 2001/009
USPC ............................................ 454/155, 76, 78
See application file for complete search history.

(56) References Cited

U.S. PATENT DOCUMENTS

| | | | | |
|---|---|---|---|---|
| 1,514,643 | A  * | 11/1924 | Wine ................. | B61D 27/0081 29/896.6 |
| 3,405,968 | A  * | 10/1968 | Feles ..................... | B60H 1/248 454/164 |
| 5,137,231 | A | 8/1992 | Boss | |
| 6,082,404 | A | 7/2000 | Schulreich et al. | |
| 6,129,312 | A | 10/2000 | Weber | |
| 6,227,962 | B1 * | 5/2001 | Orendorff ............ | F24F 13/082 454/289 |
| 6,585,582 | B1 * | 7/2003 | Ziegler ................... | B60H 1/26 2/DIG. 1 |
| 6,652,375 | B2 * | 11/2003 | Donnelly .............. | F24F 13/072 3/72 |
| 6,866,576 | B2 * | 3/2005 | Quinn .................... | B60H 1/248 454/162 |
| 6,893,338 | B2 * | 5/2005 | Katagiri ............... | B60H 1/3421 454/155 |
| 7,604,533 | B2 * | 10/2009 | Ogura .................. | B60H 1/3421 454/143 |

(Continued)

OTHER PUBLICATIONS

CA, Office Action, Canadian Patent Application No. 2,857,696 (dated Jul. 8, 2015).

*Primary Examiner* — Steven B McAllister
*Assistant Examiner* — Jonathan Cotov
(74) *Attorney, Agent, or Firm* — Thompson Hine LLP

(57) ABSTRACT

A grille for a vehicle wall opening may comprise a frame, a pair of first louvers, and a second louver. The frame may be receivable on the vehicle wall in an installed position extending around the opening, and may have an inboard side and an outboard side. The pair of first louvers may be supported on the frame, and may be transversely inclined to an outboard direction at a first angle. The second louver may be located between the first louvers, fixed relative to the first louvers, and inclined to the outboard direction at a second angle different from the first angle.

20 Claims, 3 Drawing Sheets

(56) References Cited

U.S. PATENT DOCUMENTS

| | | | | |
|---|---|---|---|---|
| 8,651,924 B1* | 2/2014 | Jones | ............... | B64D 13/02 244/118.5 |
| 2005/0030234 A1* | 2/2005 | Lauhoff | ............... | H01Q 1/3283 343/713 |
| 2012/0192978 A1* | 8/2012 | Carlson | ............... | B60H 1/249 137/855 |
| 2014/0057543 A1* | 2/2014 | Kim | ............... | B60H 1/249 454/165 |

* cited by examiner

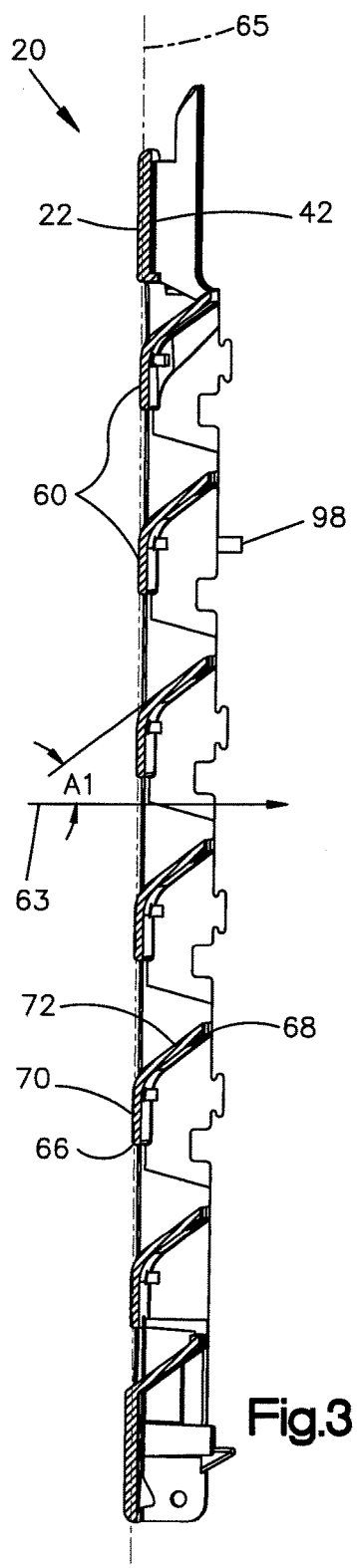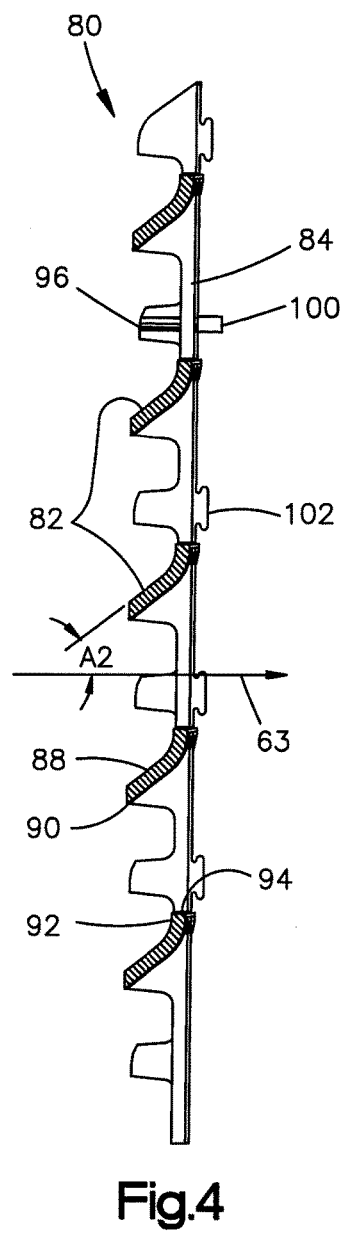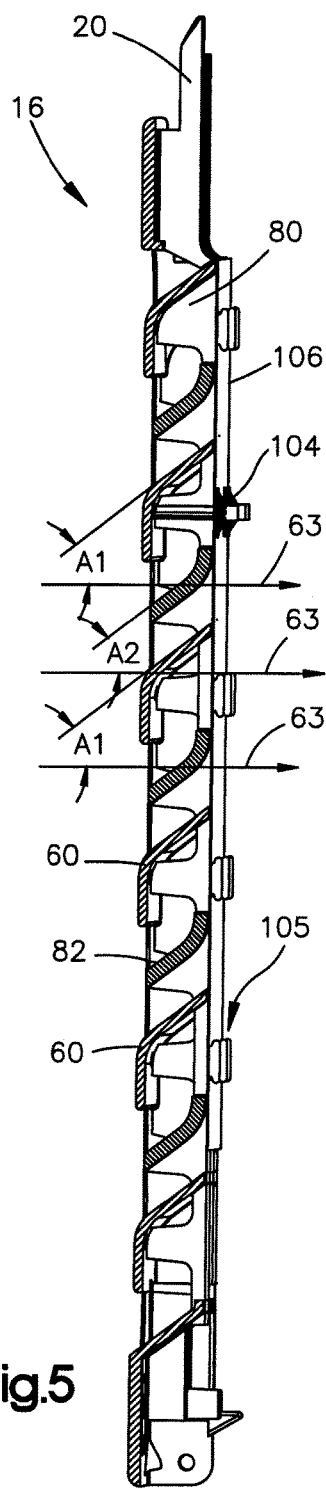

GRILLE FOR VEHICLE WALL OPENING

TECHNICAL FIELD

The present disclosure relates to a grille, and more particularly, to a grille for a vehicle wall opening.

BACKGROUND

An aircraft cabin sidewall is typically provided with decompression vent openings. Each of these vent openings may be covered by a grille that conceals the opening from view. The grille permits air to flow from the cabin outward through the opening in a decompression condition, and also attenuates noise generated by an ordinary return air flow through the grille. The air flow and noise control features of the grille may be provided by an arrangement of louvers on the grille.

SUMMARY

In an embodiment, a grille for a vehicle wall opening may comprise a frame, a pair of first louvers, and a second louver. The frame may be receivable on the vehicle wall in an installed position extending around the opening, and may have an inboard side and an outboard side. The pair of first louvers may be supported on the frame, and may be transversely inclined to an outboard direction at a first angle. The second louver may be located between the first louvers, fixed relative to the first louvers, and inclined to the outboard direction at a second angle different from the first angle.

In another embodiment, a vehicle may comprise a body including a cabin wall having a vent opening, and a grille mounted on the cabin wall over the vent opening. The grille may comprise a frame having an inboard side and an outboard side, a pair of first louvers, and a second louver located between the first louvers. The first louvers may be transversely inclined to an outboard direction at a first angle. The second louver may be fixed relative to the first louvers, and transversely inclined to the outboard direction at a second angle that differs from the first angle.

A method may comprise providing a grille for a decompression vent opening in a vehicle cabin wall. The grille may include a frame configured to extend around the decompression vent opening, and louvers configured to direct air to flow though the grille under the influence of a pressure drop from an inboard side of the cabin wall to an outboard side. The louvers may include a pair of first louvers, and a second louver located between the first louvers. The first louvers may be transversely inclined to an outboard direction at a first angle, and the second louver may be fixed relative to the first louvers and transversely inclined to the outboard direction at a second angle that differs from the first angle.

The method may further comprise providing additional first louvers transversely inclined to the outboard direction at the first angle, and additional second louvers located between adjacent first louvers, with each of the second louvers fixed relative to the first louvers and transversely inclined to the outboard direction at the second angle.

Other objects and advantages of the disclosed grille will be apparent from the following description, the accompanying drawings and the appended claims.

BRIEF DESCRIPTION OF THE DRAWINGS

FIG. 3 is a side view, partly in section, of a part of the grille embodiment of FIG. 1.

FIG. 4 is a side view, partly in section, of another part of the grille embodiment of FIG. 1.

FIG. 5 is a side view, partly in section, of the grille embodiment of FIG. 1.

DETAILED DESCRIPTION

Figure 1:
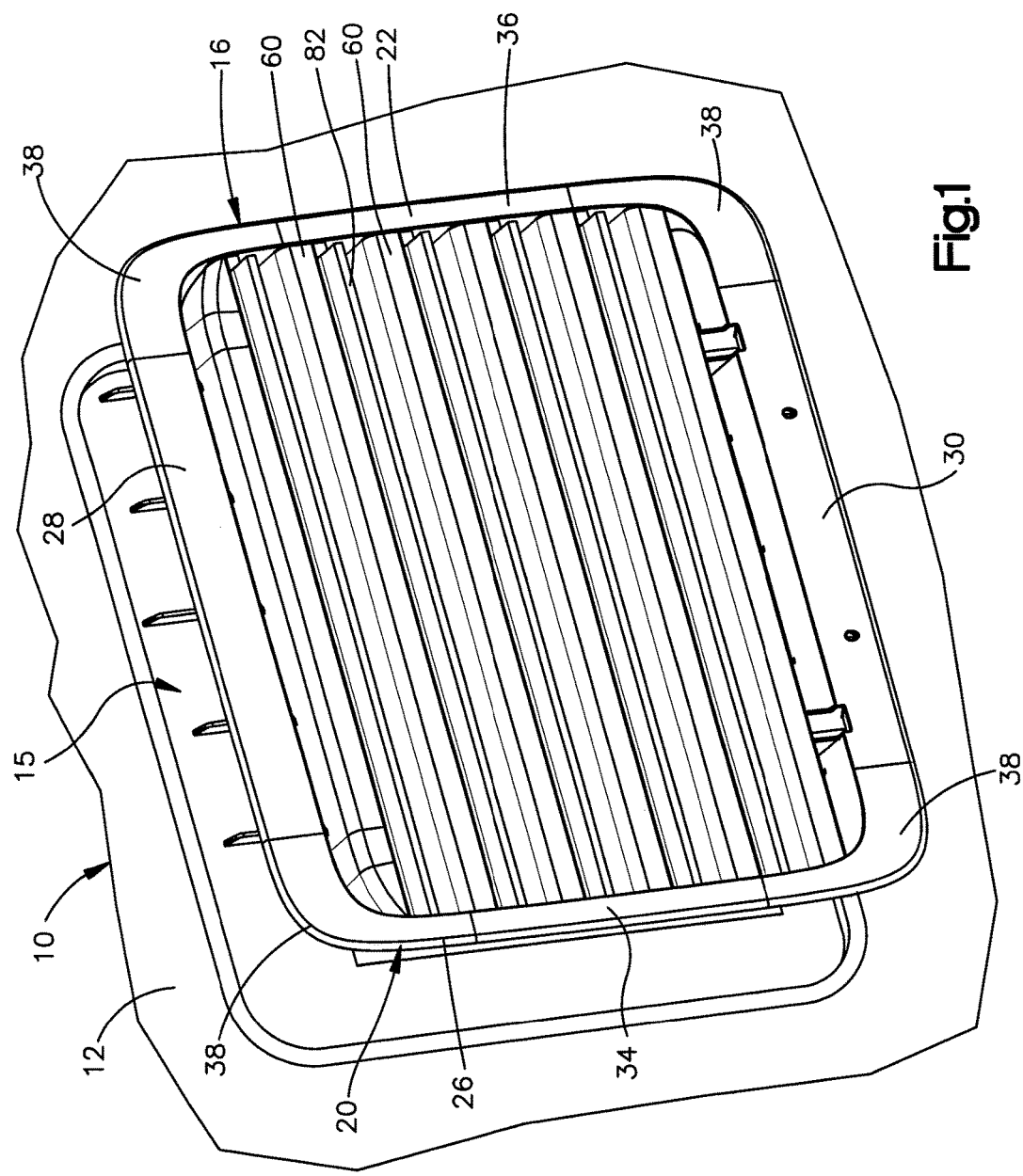
FIG. 1 is an exploded perspective view of an embodiment of the disclosed grille, taken from an inboard side and shown with a vehicle cabin wall having a vent opening.

As shown partially in FIG. 1, a vehicle body 10 may have a wall 12 with an opening 15. A grille 16 may be provided over the opening 15. The vehicle may be, for example, an aircraft, a spacecraft, a land vehicle or a marine vehicle. In the illustrated embodiment, the vehicle is an aircraft in which the wall 12 is a cabin sidewall, and the opening 15 is a decompression vent opening.

An embodiment of the grille 16 may include a frame 20. As viewed at an inboard side 22 in FIG. 1, the frame 20 may have a rectangular rim 26 with upper and lower side sections 28 and 30, left and right end sections 34 and 36, and rounded corners 38. As viewed at an outboard side 42 in FIG. 2, the frame 20 may also have a flange 44 projecting rearward from an inner edge 46 of the rim 26. Mounting structures in the form of tabs 50 may be provided at upper side section 28 of the frame 20, with additional mounting structures in the form of brackets 52 for fastener clips at the lower side section 30. Such tabs 50 and brackets 52 are configured for mounting the frame 20 on the cabin sidewall 12 in a known manner.

An array of first louvers 60 may be provided on the frame 20. The first louvers 60 and the frame 20 may be provided as portions of a unitary part which is free of joined parts. Such a unitary part may be, for example, a continuous body of material such as injection molded plastic. The first louvers 60 and the frame 20 may alternatively be provided as portions of an assembled part that includes joined parts, any one or more of which could be unitary.

The first louvers 60 may be oriented longitudinally in parallel directions extending across the frame 20 between the opposite end sections 34 and 36. The first louvers 60 may also be transversely inclined to an outboard direction through the grille 16. For example, an outboard direction through the grille 16 is indicated by the arrow 63 in FIG. 3. The outboard direction 63 in this example is perpendicular to a plane 65 between the inboard and outboard sides 22 and 42 of the frame 20. In the illustrated embodiment of the grille 16, the plane 65 extends vertically across the frame 20 between the upper and lower side sections 28 and 30, and extends horizontally across the frame 20 between the left and end sections 34 and 36.

More specifically, as shown in FIG. 3, each of the first louvers 60 may have an inboard edge 66 and an outboard edge 68. A width portion 70 of each first louver 60 may reach vertically upward from the inboard edge 66. Each first louver 60 may also have a width portion 72 that is inclined upward to the outboard edge 68. The first louvers 60 may thus be transversely inclined to the outboard direction 63 at a first angle A1.

Figure 2:
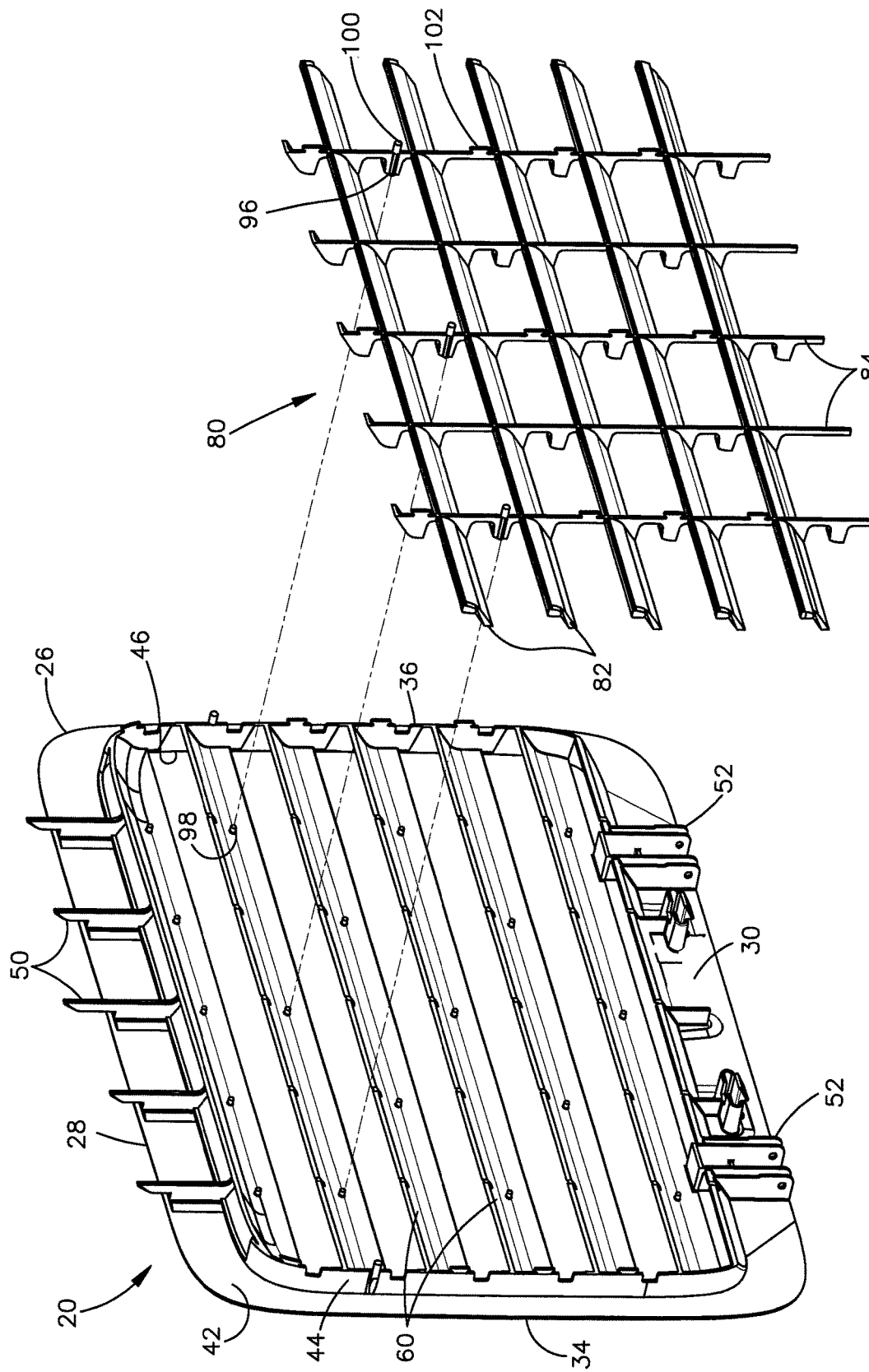
FIG. 2 is an exploded perspective view of parts of the grille embodiment of FIG. 1, taken from an outboard side.

An embodiment of the grille 16 may further include a grid 80. As shown in FIG. 2, the grid 80 may include second louvers 82 supported by stiffeners 84. The second louvers 82 and the stiffeners 84 may be provided as portions of a unitary part or an assembled part, as described above with reference to the first louvers 60 and the frame 20.

The stiffeners 84 may be oriented vertically when the grid 80 is in the upright position shown in FIG. 4, with the second louvers 82 reaching horizontally across the stiffeners 84. A width section 88 of each second louver 82 may be inclined upward from an inboard edge 90 such that each second louver 82 is transversely inclined to the outboard direction 63. In a preferred embodiment, the second louvers 82 may be inclined at a second angle A2 that differs from the first angle A1. Each second louver 82 may also have another width section 92 that reaches vertically upward to an outboard edge 94.

The stiffeners 84 may be configured for attachment of the grid 80 to the frame 20 in the assembled arrangement shown in FIG. 5. This may be accomplished by attachment bores 96 for receiving attachment posts 98 on the frame 20. The stiffeners 84 may also have posts 100 and tabs 102 for engaging retainers 104 and slots 105 on a baffle 106 that is mounted on the inboard side 22 of the grille 16. When the grid 80 is attached to the frame 20, the second louvers 82 on the grid 80 are fixed relative to the first louvers 60 on the frame 20.

As shown in FIG. 5, the first louvers 60 are vertically spaced apart from one another to define air flow paths through the grille 16. Each of the second louvers 82 is located between a pair of adjacent first louvers 60, which interposes the second angle of inclination A2 between each adjacent pair of the first angles of inclination A1. In the event of decompression of the aircraft cabin, a pressure drop through the opening 15 induces a flow of air through the grille 16 along the flow paths between the louvers 60 and 82. The differing angles of inclination A1 and A2 help to attenuate the generation of noise along those air flow paths. The sound attenuating effect may be enhanced where the grille 16, when in an upright orientation as shown in FIG. 5, has no vertical gap between the inboard edge of a louver and the outboard edge of an adjacent louver. This structural feature also improves the appearance of the installed grille 16, as each second louver 82 blocks visibility through the grille 16 between the adjacent first louvers 60 on a line of sight in the outboard direction 63.

While the methods and forms of apparatus disclosed herein may constitute preferred aspects of the disclosed grille, it is to be understood that the invention is not limited to these precise forms and methods, and that changes may be made therein without departing form the scope of the invention.

What is claimed is:

1. A grille for a vehicle wall opening, the grille comprising:
   a frame receivable on the vehicle wall in an installed position extending around the opening, the frame having an inboard side and an outboard side;
   a pair of first louvers supported on the frame, the first louvers being transversely inclined to an outboard direction at a first angle;
   a second louver located between a space defined by the first louvers, the second louver being fixed relative to the first louvers and inclined to the outboard direction at a second angle different from the first angle; and
   a plurality of stiffeners oriented in a direction substantially perpendicular to the second louver, the plurality of stiffeners and the second louver intersecting with one another to define a grid, wherein each of the plurality of stiffeners are attached to only one of the first louvers.

2. The grille of claim 1, wherein the first and second louvers each have an inboard edge and an outboard edge, and the grille is free of a gap vertically between the inboard edge of a louver and the outboard edge of an adjacent louver when the grille is in an upright orientation.

3. The grille of claim 1 wherein the outboard direction is perpendicular to a plane between the inboard and outboard sides of the frame, and the second louver blocks visibility through the grille between the first louvers on a line of sight in the outboard direction.

4. The grille of claim 1, wherein each of the first louvers has an outboard edge and reaches upward to the outboard edge at the first angle.

5. The grille of claim 4, wherein each of the first louvers further has an inboard edge and reaches vertically upward from the inboard edge.

6. The grille of claim 1, wherein the second louver has an inboard edge and reaches upward from the inboard edge at the second angle.

7. The grille of claim 6, wherein the second louver further has an outboard edge and reaches vertically upward to the outboard edge.

8. The grille of claim 1, wherein each of the first louvers has an outboard edge and reaches upward to the outboard edge at the first angle, and wherein the second louver has an inboard edge and reaches upward from the inboard edge at the second angle.

9. The grille of claim 1, further comprising additional first louvers transversely inclined to the outboard direction at the first angle, and additional second louvers located between adjacent first louvers, with each of the second louvers fixed relative to the first louvers and transversely inclined to the outboard direction at the second angle.

10. The grille of claim 1, wherein the first louvers and the frame are portions of a first part of the grille, and the second louver is a portion of a second part of the grille that is fastened to the first part.

11. A vehicle comprising:
    a body including a cabin wall having a vent opening;
    a grille mounted on the cabin wall over the vent opening, the grille comprising a frame having an inboard side and an outboard side, a pair of first louvers, and a second louver located between a space defined by the first louvers; and
    a plurality of stiffeners oriented in a direction substantially perpendicular to the second louver, the plurality of stiffeners and the second louver intersecting with one another to define a grid, wherein each of the plurality of stiffeners are attached to only one of the first louvers, and wherein the first louvers are transversely inclined relative to an outboard direction at a first angle, and the second louver is fixed relative to the first louvers and transversely inclined to the outboard direction at a second angle that differs from the first angle.

12. The vehicle of claim 11, wherein the first and second louvers each have an inboard edge and an outboard edge, and the grille is free of a gap vertically between the inboard edge of a louver and the outboard edge of an adjacent louver when the grille is in an upright orientation.

13. The vehicle of claim 11 wherein the outboard direction is perpendicular to a plane between the inboard and outboard sides of the frame, and the second louver blocks visibility through the grille between the first louvers on a line of sight in the outboard direction.

14. The vehicle of claim 11, wherein each of the first louvers has an outboard edge and reaches upward to the outboard edge at the first angle.

15. The vehicle of claim 14, wherein each of the first louvers further has an inboard edge and reaches vertically upward from the inboard edge.

16. The vehicle of claim 11, wherein the second louver has an inboard edge and reaches upward from the inboard edge at the second angle.

17. The vehicle of claim 16, wherein the second louver further has an outboard edge and reaches vertically upward to the outboard edge.

18. The vehicle of claim 11, wherein the vehicle is selected from an aircraft, a spacecraft, a land vehicle, and a marine vehicle.

19. A method comprising:

providing a grille for a decompression vent opening in a vehicle cabin wall, the grille including a frame configured to extend around the decompression vent opening;

the grille including a pair of first louvers, a second louver located between a space defined by the first louvers, and a plurality of stiffeners, wherein the first louvers are transversely inclined to an outboard direction of the grille at a first angle, and the second louver is fixed relative to the first louvers and transversely inclined to the outboard direction of the grille at a second angle that differs from the first angle, and the plurality of stiffeners are oriented in a direction substantially perpendicular to the second louver, and wherein the plurality of stiffeners and the second louver intersect with one another to define a grid, and each of the plurality of stiffeners are attached to only one of the first louvers.

20. The method of claim 19, further comprising providing additional first louvers transversely inclined to the outboard direction at the first angle, and additional second louvers located between adjacent first louvers, with each of the second louvers fixed relative to the first louvers and transversely inclined to the outboard direction at the second angle.

* * * * *